United States Patent [19]

Bakhaus et al.

[11] Patent Number: 4,687,164
[45] Date of Patent: Aug. 18, 1987

[54] SNAP-IN BUSHING

[75] Inventors: Kenneth C. Bakhaus, Jackson; Bruce C. Sdunek, Howell, both of Mich.

[73] Assignee: Mechanical Products, Inc., Jackson, Mich.

[21] Appl. No.: 556,976

[22] Filed: Dec. 1, 1983

[51] Int. Cl.$^4$ ................................................. G12B 9/00
[52] U.S. Cl. ................................ 248/27.3; 248/221.4; 24/628; 24/453
[58] Field of Search ............... 248/27.3, 221.3, 221.4, 248/222.1; 24/628, 335, 336, 453, 297

[56] References Cited

U.S. PATENT DOCUMENTS

| 2,144,885 | 1/1939 | Fadden | 248/221.3 X |
| 2,505,955 | 5/1950 | Fuller | 24/628 |
| 3,012,744 | 12/1961 | Damon et al. | 248/27.3 |
| 3,311,731 | 3/1967 | Koepke | 200/168 |
| 3,574,899 | 4/1971 | Fisher | 248/27.3 X |
| 3,764,729 | 10/1973 | Kowalewski | 24/336 X |
| 3,941,965 | 3/1976 | Piber | 248/27.3 X |
| 3,988,808 | 11/1976 | Poe et al. | 24/297 X |
| 4,227,238 | 10/1980 | Saito | 361/415 |
| 4,346,274 | 8/1982 | Mutchler et al. | 200/296 |
| 4,499,636 | 2/1985 | Tanaka | 24/453 X |

Primary Examiner—Ramon S. Britts
Assistant Examiner—David M. Purol
Attorney, Agent, or Firm—Lyman R. Lyon

[57] ABSTRACT

The disclosure relates to a bushing that can be interlocked with an electrical circuit protector without modification thereof to provide for snap-in mounting of the protector in a panel.

1 Claim, 5 Drawing Figures

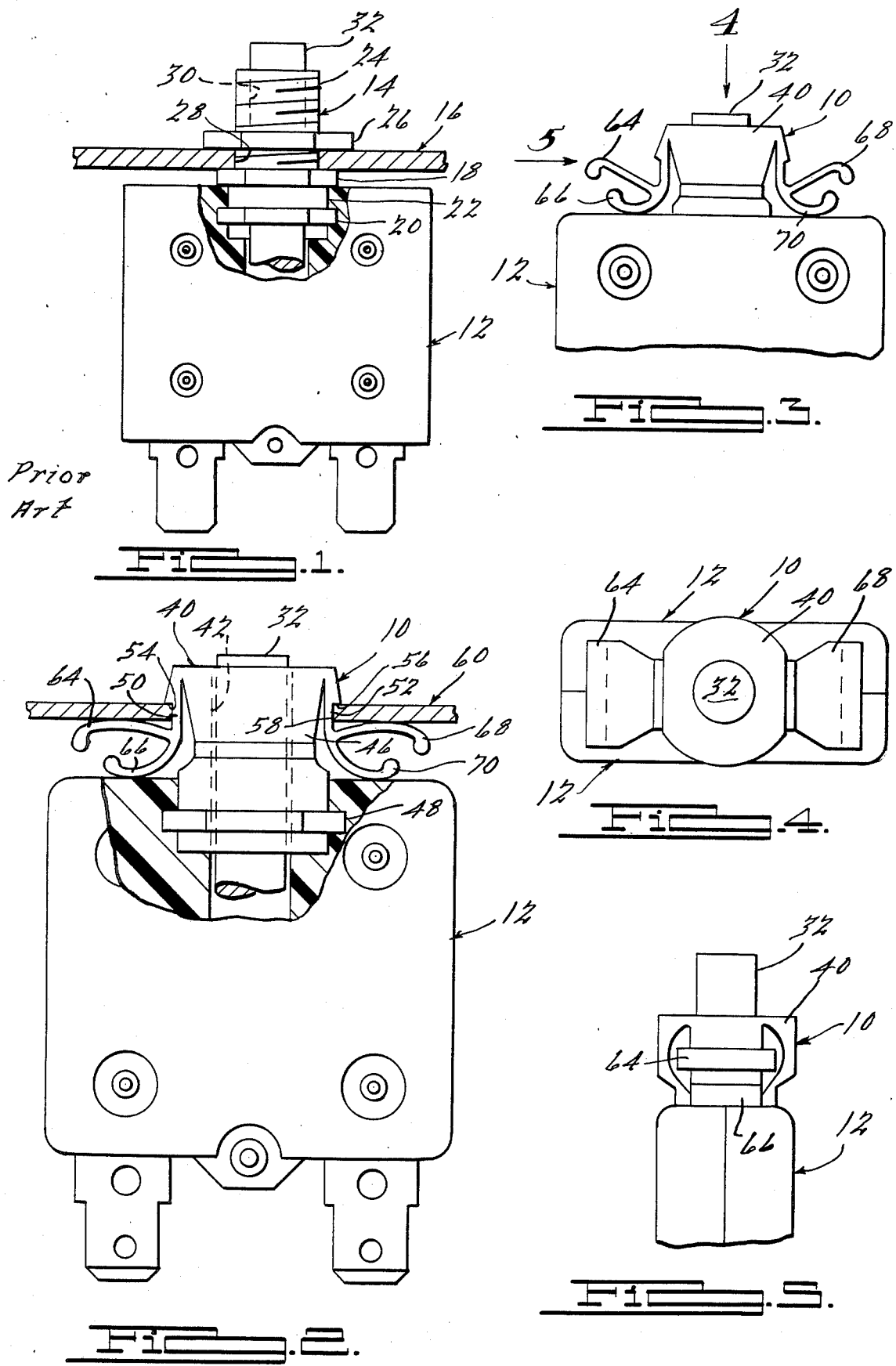

SNAP-IN BUSHING

BACKGROUND OF THE INVENTION

This application relates to an improvement on the "snap-in bracket for motor protector" disclosed and claimed in application Ser. No. 383,587, filed June 1, 1982, and assigned to the assignee of the instant invention.

Electrical circuit protectors are often provided with a cylindrical bushing that is accepted in a complementary circular aperture in a mounting panel for the protector. Such bushings are generally threaded for the acceptance of a complementary nut which retains the bushing and circuit protector tightly against the backside of the panel. Conventionally, an actuator for the electromechanical components of the circuit protector extends through the bushing for manual operation and indication of trip condition.

SUMMARY OF THE INVENTION

A snap-in bushing for an electrical circuit protector in accordance with the instant invention offers an alternative mounting configuration for the protector. The conventional bushing is replaced by the snap-in bushing which mechanically interlocks with the interior of the protector in a manner similar to the original bushing. The snap-in bushing is designed to be accepted in a conventional circular aperture in a mounting panel. The electromechanical components of the protector remain the same as in the conventional, nut-retained bushing application.

The snap-in bushing of the instant invention is designed to accommodate mounting panels of varying thickness, the bushing automatically compensating for thickness of the panel upon assembly of the protector with the panel.

BRIEF DESCRIPTION OF THE DRAWINGS

FIG. 1 is an elevational view, partially in section, of a conventional prior art mounting bushing for a motor protector;

FIG. 2 is a view, similar to FIG. 1, showing the snap-in bushing of the instant invention mounted within the conventional motor protector of FIG. 1;

FIG. 3 is a view of the snap-in bushing with the protector removed from the mounting panel;

FIG. 4 is a view taken in the direction of the arrow "4" of FIG. 3; and

FIG. 5 is a view taken in the direction of the arrow "5" of FIG. 3.

DETAILED DESCRIPTION OF THE PREFERRED EMBODIMENT OF THE INVENTION

As seen in FIG. 2, a snap-in bushing 10 for an electrical circuit protector 12 is adapted to replace a conventional bushing 14 (FIG. 1) normally used to mount the electrical circuit protector 12. The bushing 14 mounts the motor protector 12 on a panel 16. The conventional bushing 14 has a pair of hexagonal flanges 18 and 20 disposed on opposite sides of a cylindrical portion 22. A threaded portion 24 accepts a nut 26. The nut 26 locks the bushing 14 and circuit protector 12 within a complementary aperture 28 in the panel 16. The bushing 14 has a central bore 30 for the acceptance of a manual operator 32 of the circuit protector 12.

In accordance with the instant invention, the snap-in bushing 10 is mounted in the position occupied by the bushing 14. The bushing 10 is molded from, for example, Nylon or other high strength, resilient plastic material having a significant memory.

As best seen in FIG. 2 of the drawings, the bushing 10 comprises a frontal portion 40 having an aperture 42 therein for the acceptance of the manual operator 32 of the protector 12. The aperture 42 is of the same diameter as the inside diameter of the conventional bushing 14.

The frontal portion 40 of the bracket 10 has a depending cylindrical sleeve 46 thereon with a radially extending flange 48 at the lower extremity thereof. The flange 48 is of hexagonal cross section for acceptance in place of the flange 20 of the bushing 14 so as to mechanically lock the bushing 10 within the protector 12.

A pair of locking arms 50 and 52 having positioning shoulders 54 and 56 thereon, respectively, depend downwardly as seen in the drawings, from opposite ends of the frontal portion 40 for positively locking the bushing 10 and protector 12 within complementary aperture 58 in a mounting panel 60. The arms 50 and 52 have laterally extending fingers 64, 66 and 68, 70, respectively, for maintaining a bias on the back side of the panel 60 and top of the protector 12. The lines of contact of the fingers 64, 66 and 68, 70 are positioned so as to maintain an outward bias on the arms 50 and 52 on the side wall of the aperture 58 thereby maintaining the shoulders 54 and 56 on the arms 50 and 42 in locked relationship therewith. From the foregoing it should be apparent that the frontal portion 40, sleeve 46 and flange 48 function to positively lock the bushing 10 within the housing of the protector 12. When installed in the panel 60, the fingers 64, 66 and 68, 70 function to positively lock the bushing 10 within the aperture 48 in said panel 60.

In accordance with one feature of the instant invention, mounting of the bushing 10 in panels of different thickness is accommodated by flexure of the fingers 64 and 68 toward and away from the protector 12. The spring action developed by compression or bowing of the fingers 64 and 68 places a radially outward bias on the arms 50 and 52. The outward bias on the arms 50 and 52 tends to lock the shoulders 54 and 56 against the frontal face of the panel 60 and within the aperture 58 therein.

From the foregoing description, it should be apparent that the snap-in bushing of the instant invention provides for mounting of an electrical circuit protector by a relatively fast, snap-in action. In addition, the bushing gives a competitive advantage to the user thereof in that it allows a protector designed for normal bushing mounting to be snap-mounted in a panel without a doubling of inventory. Moreover, positive mounting is achieved in panels of varying thickness. It is to be noted that the particular form of bushing configuration utilized in prior art circuit protectors can be duplicated by the interlocking element of the bushing, as required. The essential element is that the geometry used to capture the bushing in the protector be duplicated by the geometry of the snap-in bushing.

While the preferred embodiment of the invention has been disclosed, it should be appreciated that the invention is susceptible of modification without departing from the scope of the following claims.

I claim:

1. A snap-in bushing for mounting an electrical circuit protector in an aperture in a mounting panel, said bushing comprising a hollow cylindrical mounting sleeve adapted to extend through an aperture in a housing of said circuit protector, said mounting sleeve including a radially outwardly extending annular flange at one end thereof for mechanically securing said bushing to said circuit protector, said bushing having a frontal portion at an opposite end thereof disposed exteriorly of the circuit protector housing with a pair of diametrically spaced arms depending in cantilevered relation therefrom towards the housing and movable toward one another so as to be acceptable within the aperture in said mounting panel, said arms having a pair of positioning shoulders thereon, respectively, engageable with a front surface of said mounting panel, each of said arms having a pair of axially spaced laterally extending resilient fingers one of which is engageable with a back surface of said mounting panel and the other of which is engageable with a front surface of said circuit protector to position said circuit protector relative to said panel.

* * * * *